May 5, 1970  J. R. BARNETT  3,509,962
GAS EXPLODER WITH ATOMIZER LIQUID EXTRACTOR
Filed April 7, 1969
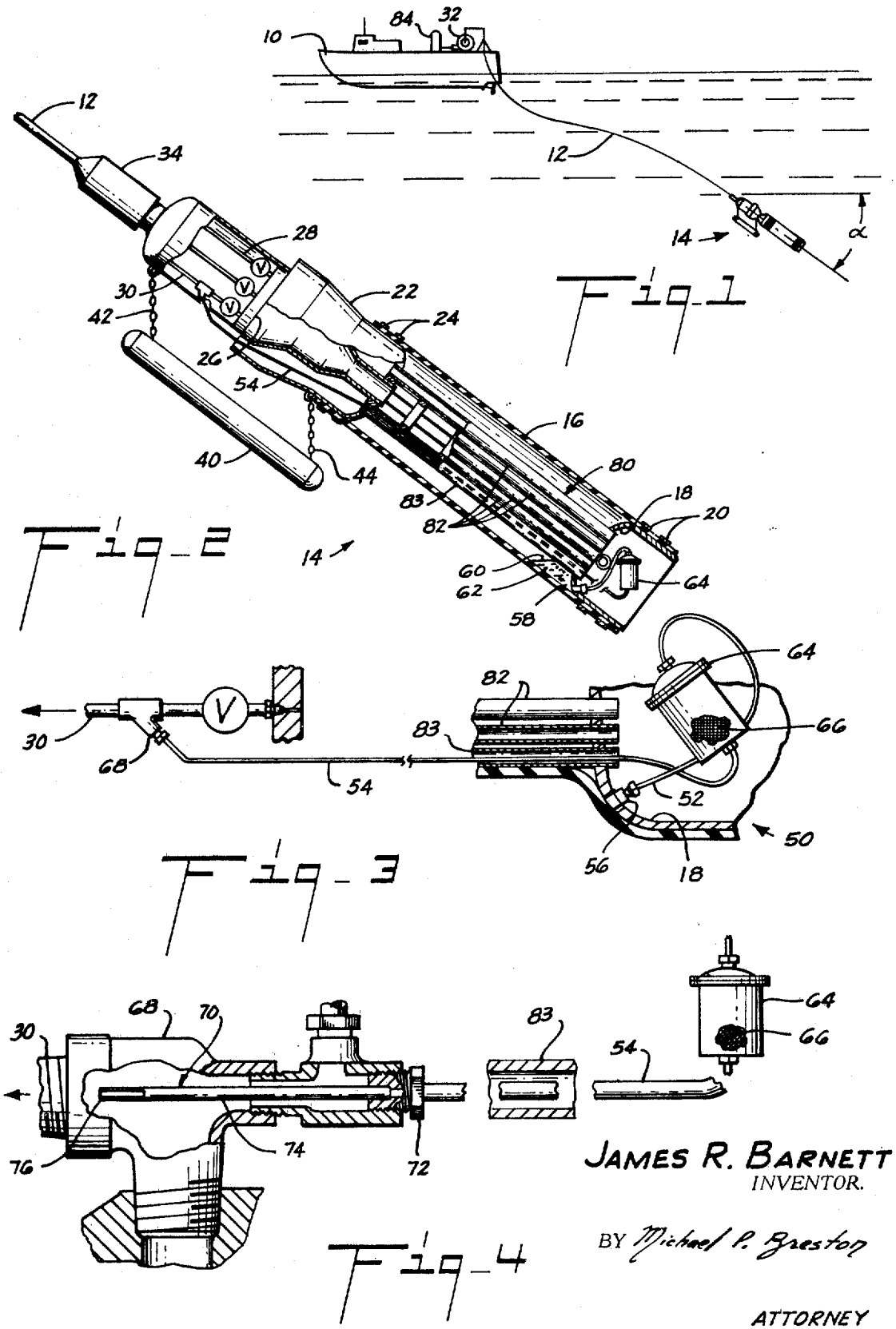
JAMES R. BARNETT
INVENTOR.
BY Michael P. Breston
ATTORNEY 3,509,962
GAS EXPLODER WITH ATOMIZER
LIQUID EXTRACTOR
James R. Barnett, Greneda, Miss., assignor to Western
 Geophysical Company of America, Houston, Tex., a
 corporation of Delaware
Filed Apr. 7, 1969, Ser. No. 814,090
Int. Cl. G01v 1/06; H04v 23/00
U.S. Cl. 181—.5   11 Claims

ABSTRACT OF THE DISCLOSURE

A seismic gas exploder having a combustion chamber for receiving a mixture of combustible gases and an atomizer liquid extractor coupled thereto for automatically extracting and carrying away the liquid products of condensation from each cycle of exploder operation.

Background of the invention

In seismic gas exploders during each cycle of operation a charge of combustible gases is admitted into a combustion chamber to become ignited as by an ignition system including a spark plug. A typical charge of combustible gases includes a mixture of propane and oxygen. Subsequent to the explosion the products of combustion become condensed resulting in spent gases and in liquids including mostly water. In addition to the accumulation of water, there are also formed in some exploders, especially those having a rubber boot, rubber and steel particles.

In prior practice to remove the undesired accumulation of water and foreign matter, the exploder would be periodically lifted to the surface and manually drained and cleaned. Obviously, the removal time of the gas exploder from operation as well as the draining time amounted to an appreciable down time, which, in seismic prospecting, is extremely expensive.

Summary of the invention

To conventional gas exploders, especially of the type having a rubber boot as the extensible wall and known in the trade as Aquapulse, a trademark of assignee, there is coupled, in accordance with this invention, a suitable filter, which allows undesirable foreign particles to become trapped therein, and a liquid atomizer for extracting the liquid products of combustion which become sucked up by the exhaust gases of the exploder.

It is therefore a main object of the present invention to allow for automatic extraction and atomization of liquid products of combustion formed during each cycle of operation in seismic gas exploders.

It is another object of this invention to allow marine gas exploders to operate for greater periods of time without servicing them and to extend significantly their useful life.

These and other objects of the present invention will become better understood from the following description of preferred embodiments especially when taken in connection with the accompanying drawings in which:

FIG. 1 shows a sesimic gas exploder using this invention attached to a tow line of a seismic boat;

FIG. 2 is an enlarged view partly in cross-section and partly in perspective of the exploder shown in FIG. 1;

FIG. 3 is a detail view partly in cross-section of one embodiment of this invention; and FIG. 4 is a partial view of a modified embodiment of this invention.

Referring to FIGURE 1, there is shown a seisic boat 10 to which is attached a tow cable 12 for towing a seismic marine gas exploder, generally designated as 14. The gas exploder 14 may be of known types, such as Dinoseis, trademark of Sinclair Corporation, etc. The invention, however, will be illustrated in connection with the Aquapulse System, a trademark of assignee.

The Aquapulse gas exploder is more specifically described in U.S. Pat. 3,480,101, issued Nov. 25, 1969. The Aquapulse includes a resilient sleeve or boot 16, preferably made of rubber, fixedly clamped to one end seal 18 by a clamp 20 and to another end seal 22 by a clamp 24. The end seal 22 is horn-shaped and is terminated by an end wall 26. An input line 28 periodically supplies a charge of combustible gases from the deck of boat 10. An exhaust line 30 is connected to a vacuum pump 32 also on deck of boat 10, to allow the exhaust gases to better escape. The vacuum-operated exhaust system is more fully described in said copending application. Various inlet and outlet valves are employed to regulate the timing of the input combustible gases and the output exhaust gases. The inlet line 28 also includes one or more spark plugs (not shown) for periodically igniting the combustible charge inside boot 16. The inlet and exhaust lines 28, 30 as well as the electric wires used to service the exploder 14 are grouped together with the tow cable 12 which is secured to a harness 34.

Flexibly attached to exploder 14, as by cables 42, 44, is a ballast weight 40. Ballast 40 has a mass sufficient to allow the exploder 14 to be towed by cable 12 at an angle alpha, preferably between 25° to 40°. Since exploder 14 is towed at an angle, the liquid products of combustion will be gathered at its inclined end close to end seal 18.

To remove such liquid products of combustion in accordance with this invention there is provided an atomizer liquid extractor generally designated as 50 which includes a drain pipe 52 and a siphon tube 54. The drain pipe is connected to the combustion chamber of the gas exploder 14 through a suitable drain plug 56 positioned opposite to the lower-most inclined corner 58 which accumulates the liquid products of combustion 60 and the solid products of combustion, if any, as well as rubber and metal debris, generally designated as 62.

To remove the solids 62 there is provided a suitable filter 64 coupled between the drain pipe 52 and the siphon tube 54. Filter 64 includes a throw-away filter element 66 which can be a spool of non-corrosive metal scraps such as bronze or stainless steel wool such as are commonly used in household cleaning.

If the siphon tube 54 were of relatively large diameter without a restriction, the filtering liquids from filter 64 would form in tube 54 a "solid" column of liquid. Since the gas exploder 14 frequently operates at depths between 30 to 50 feet below the surface of the body of water, even a perfect vacuum-operated exhaust system could not lift the "solid" liquid column from the relatively large diameter siphon tube 54 through the exhaust line 30.

In accordance with the embodiment shown in FIG. 3, the siphon tube 54 is made to have a restricted diameter so as to prevent the establishment therein of an unbroken "solid" liquid column. While the theory of operation of the siphon tube may not be fully understood, it is believed that the restricted-diameter siphon tube causes the "solid" liquid column therein to break up into liquid droplets which can then be easily pulled away by the flow of exhausting gases in the exhaust line 30 to which the siphon tube 54 is coupled through a connector 68.

In one embodiment, siphon tube 54 was made of ⅛" or 3/16" copper tubing. About three gallons of liquid mostly water could be drained per hour. Of course the optimum diameter for tube 54 can be experimentally determined: if the diameter is too large, the water extraction from the exploder will be very poor or nil since the water column in tube 54 cannot be lifted by the vacuum in the exhaust line 30, typically 20" of mercury; on the other hand, if the diameter is too small the tube is likely to become plugged up or offer excessive internal wall friction. The considerations for selecting the proper diameter for tube 54 will be apparent to those familiar with nozzles and the theory of atomization of liquids into a jet of gases.

A modified embodiment is shown in FIG. 4 wherein the atomization of the liquid column in the siphon tube 54 is achieved externally of the siphon tube by a suitable nozzle 70 which is threadedly secured to the siphon connector 68. While nozzle 70 may be commercially purchased, it can conveniently be made from a threaded copper bushing 72 to which is silver soldered a section of copper tubing 74 which may have a length of 4" and an inner diameter of ⅛". The tip 76 of tube 74 is bent to better atomize the liquid droplets through tube 74. With the use of nozzle 70, the siphon tube 54 can be made of a relatively larger diameter copper tube or rubber hose, since the atomization is achieved primarily by the nozzle instead of the siphon tube 54, as was the case with the embodiment shown in FIG. 3.

To bring the siphon tube 54 from the end seal 18 of exploder 14 to the opposite end seal 22, advantage is taken of the existence of a cage 80 inside the rubber boot 16. Cage 80 is formed of a plurality of water-carrying tubes 82 extending between end seals 18 and 22. The water-carrying tube 82 prevent the exploder from burning up as a result of the successive internal explosions. Tubes 82 having a relatively large diameter, the siphon tube 54 is easily inserted in one of such tubes 83.

The liquid droplets extracted from the exploder 14 by the atomizer liquid extractor 50 are carried away by the velocity of the exhaust gases flowing through the exhaust line 30 to a liquid separation tower 84 on deck of boat 10. In the tower 84, the atomized liquids, which are either in fog, mist or vapor state, become condensed and subsequently ejected.

The operation of the gas exploder 14 is described at great length in said copending patent application. For purposes of the present invention, it will suffice to state that periodically a combustible charge of gases is admitted through the inlet line 28 into the exploder 14. Then the charge is ignited, as by a spark plug, to create a combustion which abruptly raises the internal pressure inside the combustion chamber defined by the boot 16. The rise in internal pressure causes boot 16 to extend outwardly thereby creating a compression seismic wave through the water body surrounding exploder 14. During the pressure rise, the condensed liquids in the combustion chamber become forcibly ejected through the drain pipe 52, filter 64 and into the siphon tube 54.

Subsequent to the explosion boot 16 collapses against the outer wall of cage 80 thereby sealing off the entrance port to the drain pipe 52. This sealing off effect is desirable since immediately after the collapse of boot 16 the gas inlet valves are opened to allow a new charge of combustible gases to enter through the inlet line 28 into the combustion chamber. The sealed off drain pipe 52 prevents the escape of the combustible gases through the siphon tube 54. Also the water in filter 64 acts as a stop valve. A similar result could be achieved by the use of a check valve which would automatically open when the pressure inside boot 16 rises, subsequent to each internal combustion, and then would automatically close.

Certain products of combustion become condensed by the water flowing through the water tubes 82 and the external sea water surrounding boot 16. The liquid products of combustion accumulate in the corner 58 of exploder 14 to become drained by the atomizing liquid extractor 50 which produces liquid droplets either by the siphon tube 54 or by the nozzle 70. The liquid droplets are sucked up by the exhaust gases flowing from the exploder 14 through the exhaust line 30 into the vacuum pumps 32 and thence to the separation tower 84 on deck of boat 10. The solid particles 62 are effectively trapped by the filter element 66 which is periodically replaced by a new element.

Since the invention makes use of atomizing means to break up a column of liquid into liquid particles, the term atomizing means as used in the claims shall mean any means adapted to break up a body of liquid into liquid particles, such means inclduing but not limited to nozzles, reduced diameter siphon tubes, or any other means capable of accomplishing the desired breaking up of a liquid column.

While certain exemplary dimensions were given, it will be appreciated that other dimensions may be used and other suitable modifications and equivalents may be restorted to without departing from the scope of the invention as defined in the claims attached hereto.

What I claim is:

1. A gas exploder system including:
   a housing, said housing defining a combustion chamber assembly, said combustion chamber periodically receiving a mixture of combustible gases which, when ignited, produce gaseous products of combustion and liquid products of combustion;
   gas exhaust means operatively coupled to said housing and arranged to purge said gaseous products of combustion from said combustion chamber,
   liquid exhaust means operatively coupled to said housing for automatically extracting said liquid products of combustion from said combustion chamber, and
   said liquid exhaust means including atomizing means.

2. The gas exploder system of claim 1 wherein:
   said liquid exhaust means include a filter for filtering out solid particles from said extracted liquid products of combustion.

3. The gas exploder system of claim 2 wherein:
   said filter includes a filter element made of non-corrosive metal.

4. The exploder system of claim 1 and further including:
   means coupled to said housing for angularly orienting said explosion chamber during tow by a seismic boat to allow said liquid products of combustion to accumulate in a space inside said combustion chamber adjacent to said liquid exhaust means.

5. The gas exploder system of claim 4 wherein:
   said combustion chamber assembly includes:
     an elastic inflatable member, and
       said inflatable member covering at least a portion of the outer surface of said combustion chamber assembly.

6. The gas exploder system of claim 1 wherein said liquid atomizing means includes conduit having a restricted passage therein to cause said extracted liquids to become atomized into liquid droplets.

7. The exploder system of claim 1 wherein said atomizing means include a nozzle for atomizing said extracted liquids into liquid droplets.

8. The gas exploder system of claim 5 wherein said liquid extracting means include a drain outlet the entrance to which becomes sealed off periodically by said elastic inflatable member.

9. The gas exploder system of claim 1 wherein said combustion chamber assembly further includes a plurality of water-carrying tubes extending between two ends of said housing, and said exhaust means include a conduit positioned in one of said water tubes.

10. The gas exploder system of claim 9 wherein said conduit is connected to a vacuum-operated exhaust line coupled to said housing.

11. The gas exploder system of claim 7 wherein said nozzle is connected to a vacuum-operated exhaust line coupled to said housing.

References Cited

UNITED STATES PATENTS 3,397,755   8/1968   Loper.

RODNEY D. BENNETT, JR., Primary Examiner

B. L. RIBANDO, Assistant Examiner

U.S. Cl. X.R.

340—7